Figure 1:
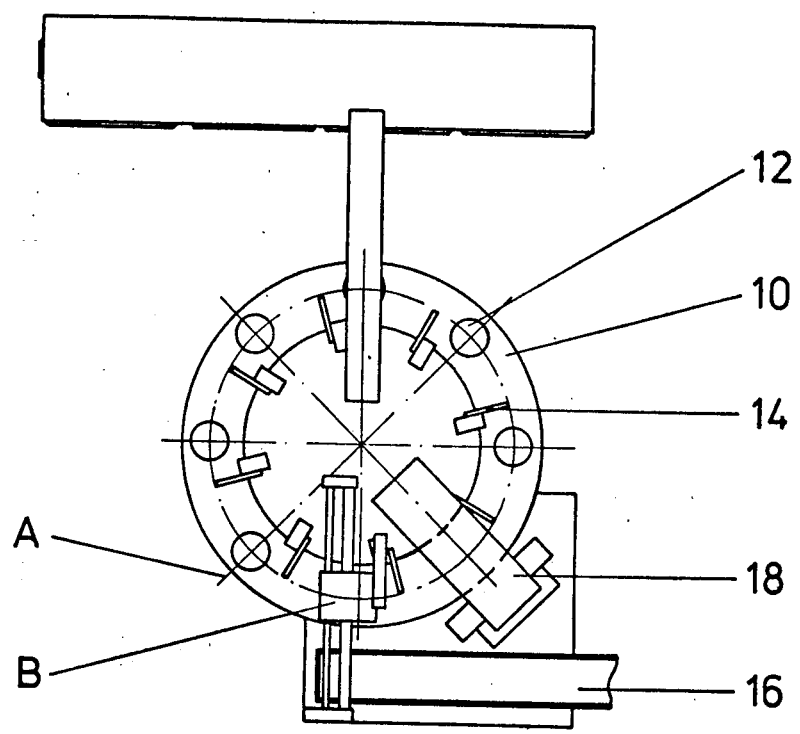

United States Patent [19]

Napierski

[11] 4,152,103
[45] May 1, 1979

[54] DEVICE FOR BAKING SELF-BOND COIL WIRES

[75] Inventor: Reinhard H. Napierski, Eschborn, Fed. Rep. of Germany

[73] Assignee: Balzer & Dröll KG, Niederdorfelden, Fed. Rep. of Germany

[21] Appl. No.: 864,400

[22] Filed: Dec. 27, 1977

[30] Foreign Application Priority Data

Dec. 29, 1976 [DE] Fed. Rep. of Germany ... 7640891[U]

[51] Int. Cl.² .................. B30B 9/00; B30B 15/30; B30B 15/34
[52] U.S. Cl. ................................ 425/407; 425/384
[58] Field of Search .............. 425/407, 384, 126 R, 425/128

[56] References Cited

U.S. PATENT DOCUMENTS

| 1,888,211 | 11/1932 | Apple | 425/128 |
| 1,932,391 | 10/1933 | Apple | 425/128 |
| 2,018,480 | 10/1935 | Apple | 425/128 |
| 3,019,505 | 2/1962 | Van Den Berge et al. | 425/407 X |
| 3,340,574 | 9/1967 | O'Brien et al. | 425/407 |
| 4,093,413 | 6/1978 | Schollhorn et al. | 425/126 R X |

*Primary Examiner*—J. Howard Flint, Jr.
*Attorney, Agent, or Firm*—Larson, Taylor and Hinds

[57] ABSTRACT

A device for baking self-bond coil wires with one another and with a support on which a coil of the self-bond coil wires is supported. The coils are moved relative to a pressing means, such as a mold, and are heated prior to being pressed by the pressing mold. The heated wires are thus pressed and cooled at the same time thereby permitting rapid operation. The coils are conveniently loaded sequentially onto a moveable conveyor member for movement to a pressing station. The coils are heated while being moved to the pressing station such as by passing electrical current through the wire of the coil. After pressing, each coil is removed from the conveyor member and a fresh coil is loaded on the conveyor for processing.

8 Claims, 2 Drawing Figures

DEVICE FOR BAKING SELF-BOND COIL WIRES

The invention relates to a device for baking self-bond coil wires with one another and with a coil support, e.g. a core stack provided with slot insulations.

It is often required to fix the coil wires of electric machines. For this purpose it is known to wind the coil of wire with not only an insulation varnish coat but also a thermoplastic coat applied over the first one. The wires so provided are fixed to one another when heated to the fusing temperature of the thermoplastic coat. For the thermoplastic coat, thermoplastic resins, such as polyvinylbutyral or polyamide can be used. Other thermally hardenable varnishes which are offered specially for the use as thermoplastic coat by the varnish industry may also be used. Tests with self bond wire are published e.g. in the magazine "elektrotechnik", Vogel-Verlag, 53rd annual publication, no. 20, 21 and 24 of 1971; 54th annual publication, no. 4 and 6 of 1972.

The self bond coil wires only bake reliably with one another and with the coil support if these are pressed toughly against each other. The pressing effect can either be applied by means of a strong current impulse through the coils which produces a sufficiently strong electromagnetic force on the coil wires or by a pressing mold. (DT-AS German Auslegschrift) 1,613,107 and DT-OS German Offenlegungsschrift 1,613,209 respectively). In both cases the coil wire can be heated to the temperature required for baking, e.g. 160° C., so that current is fed through the coil the joulean heat of which effects the heating. However, alternatively it can be heated in a furnace, too.

In the known devices, the coils of self bond wire are heated with and are pressed together and into the requested shape by means of a pressing mold, heating and pressing being done simultaneously. In continuous production by means of a belt conveyor or an indexing table, a larger amount of pressing molds results since each pressing mold remains in touch with a certain coil support during the entire period of heating and a certain time thereafter. The necessity of numerous pressing molds exists because basically slow heating leads to a more uniform and better working result than quick heating of the coils which results in locally different maximum temperatures.

Only in exceptional cases can coils be pressed first and then be heated, since normally these get loose again and larger gaps between the single coil wires result when the pressing effect is discontinued.

It is an object of the present invention to create a device of the kind, mentioned above, which is suitable to line-production systems and with which, independently of the period of heating of the coils and the adjacent parts of the coil support, very short cycle times can be obtained with a single pressing mold or only few such molds which may be different from one another.

The aforesaid object is solved according to the invention in that the coil support with the coils and the pressing mold can be moved relatively one to another in the sense of motion of the conveyer and can be pressed against each other after the heating installation.

The invention makes use of the idea that the pressing mold must only start operation when the thermoplastic coat has obtained the fusing temperature required for baking. Then it only has to be in touch with a certain coil support until the thermoplastic coat has joined perfectly the individual coil wires one with another and with the coil support. This period of time is only a fraction of the time required previously for heating.

Baking takes place when, starting from the set fusing temperature, the temperature drop of the thermoplastic coat has become so great that the coat adhering to the single coil wires which has flown together in the fused state achieves a perfect bond. In order to achieve short cycle times, the cooling process of the wires being pressed one against another on fused thermoplastic coat should therefore take only a minimum of time. This, however, is not the case if the pressing mold already has been with the coil during its heating for then the pressing mold would be heated, too. In the present invention the pressing mold contributes to cooling and thus to a speedy setting procedure.

In a first alternative type of execution of the invention the pressing mold is locally fixed beside the conveyer and the heating installation stretches along the conveying path to the pressing mold.

In this case the coils are heated on the coil support whilst being transported by the conveyer until these reach the pressing mold. The mold presses the coil wires with the fused thermoplastic coat into the desired position in which, on cooling, a perfect bond of the wires with one another and with the coil support over the thermoplastic coat takes place. The cycle time of the device is determined with a single pressing mold by the period of time necessary to obtain a sufficient bond of the thermoplastic coat during the use of the pressing mold. Shorter cycle times can be obtained if two pressing molds are arranged one beside another, whereby each coil support, however, is treated by means of one pressing mold only.

Since the bonding process of the thermoplastic coat does not occur immediately but takes some time, there is also the possibility to use one after another different pressing mold tools which form various ranges of a coil, e.g. inside or outside a stator if this proves to be practical for constructional reasons.

Instead of conveying the coil supports on a belt or indexing table and heating them whilst being fed to a pressing mold, the inverse order can be chosen. On doing so, one pressing mold or several of them are transported from a pre-heated coil support to the next by means of a suitable coneveyer, whereby the last ones are fixed locally during both the heating and the subsequent pressing, pressing being effected after switching off the heating means.

In order to achieve an uniform heating, it can further be provided that the coil supports are moved or arranged respectively within a casing during pre-heating. By this the cycle time can be reduced, too. Cooling of the pressing mold can also serve to reduce cycle time.

An excellent working result only can be gained if the individual coil wires bake in a tightly pressed state and with the coil support. Pressing together the wires in the core stack can be done, as is known, by means of radially expandable lamellas which squeeze radially on the coil wires and the slot insulation via the normally inserted so-called wedges outwards through the slot openings. Since it is useful to cover with thermoplastic coat also the wedges and the slot insulation, in the end these insulation materials are baked with the coil wires and the core stack, too.

If the stator slots in cross section are much wider than their openings in the stator bore, at this place a squeezing back tool is advisable which consists e.g. of a rim of T-type lamellas in cross section which are at first inserted axially into the stator slots and then are pressed radially outward. Since these T-type lamellas can be wider than those known lamellas which fit through the slot openings, a more uniform pressure can be obtained throughout the width of the wedges.

The invention is explained below in detail by the aid of the example of execution represented in the drawing.

Figure 2:
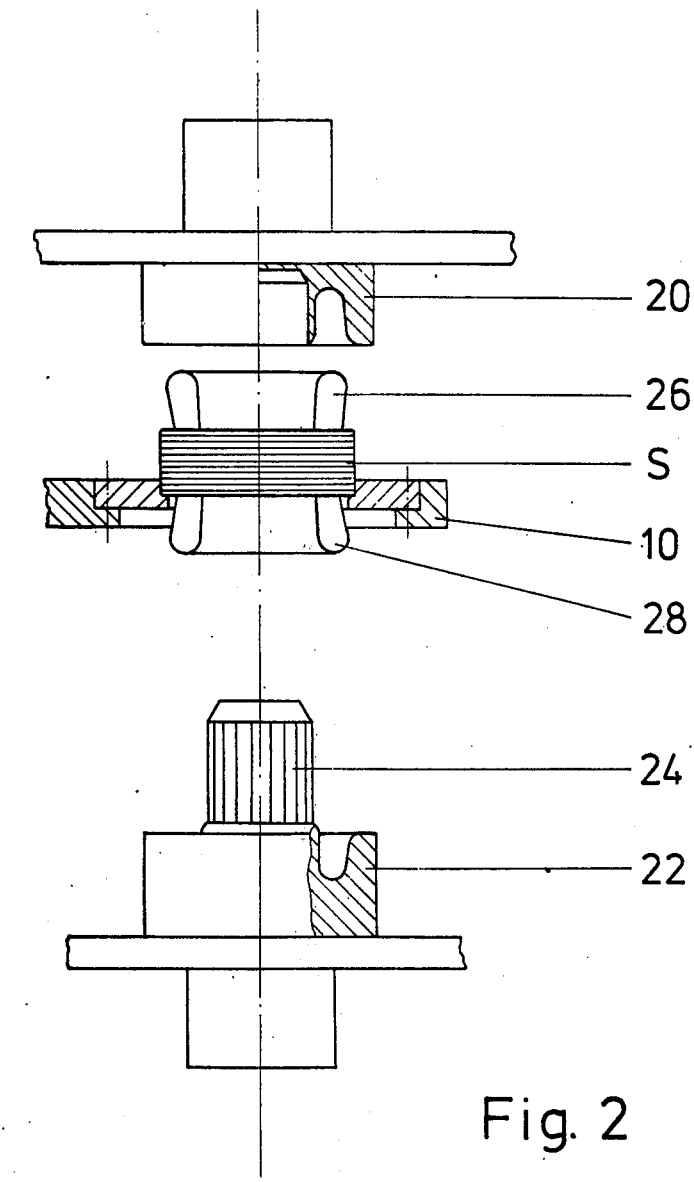

FIG. 1 is a diagrammatic top view of a device in accordance with the invention; and FIG. 2 is a diagrammatic elevation view, partly in cross section, of a pressing mold in the device of FIG. 1.

The device represented in FIG. 1 has an indexing table 10 with eight indexing positions. The number of the indexing positions could be smaller or larger, depending upon the size of the stator and the cycle time in the particular case. The indexing table 10 moves step by step clockwise. It has eight stator locating bores 12 which are distributed uniformly on the circumference. Beside each stator locating bore, electric terminals 14 are attached to the indexing table 10. The stator coils are to be connected to a power source so that a current can be fed through the coils which heats them to the requested temperature of e.g. 160, 180 or even more than 200° C.

The stators are positioned at the indexing position marked A in the stator locating device 12 and the stator coils are connected to the appropriate terminals. During the gradual transportation through ¾ of the circumference of the indexing table, the coils are heated by joulean heat. After each indexing step of the indexing table, another stator is placed into indexing position A on the indexing table for baking coils. At the same time the stator with bonded coils in indexing position B of the preceding indexing step is removed automatically or manually from the indexing table. Thereafter the stator can be transported e.g. on a conveyer belt 16, a slide etc.

One indexing step before station B, there is a pressing mold 18 at the indexing table which is represented in vertical cross section in FIG. 2. In particular it is composed of an upper forming device 20, a lower forming device 22 and a lamella mandrel 24 attached to the side of the latter. The upper forming device presses the upper winding heads 26 of the coils of the stator and the lower forming device 22 presses simultaneously also the lower winding heads 28 of the stator S. Also at the same time or a bit earlier or later, the lamellas of the lamella mandrel 24 squeeze back radially over the wedges towards the insulated slot side the coil wires which were inserted into the stator slots. These pressing procedures take place after the thermoplastic coat of the coil wire and the adjacent parts of the coil support, e.g. the wedges and the slot insulation, have been heated to sufficient fusing during the gradual transportation on the conveyor 10. Thereafter, the parts 20, 22, 24 of the pressing mold contribute to the cooling and setting of the thermoplastic coat.

In an alternative embodiment of the invention, the upper and lower forming device 20, 22 could also be replaced or completed by segment type pressing mold parts which can be pressed radially from outside in order to form the winding heads in a certain way and to bake them with the stator. Basically the invention is independent of the execution of the pressing mold.

What is claimed is:

1. Apparatus for baking self-bond coil wires with one another and with a support on which a coil of the self-bond coil wires is supported comprising:

means for heating a supported coil of self-bond coil wires;

means for pressing said supported coil of self-bond coil wires;

means for moving said supported coil of self-bond coil wires and said pressing means, relative to one another;

means for actuating said pressing means when a supported coil of self-bond coil wires is in position for pressing by said pressing means;

means for actuating said heating means while a supported coil of self-bond wires is moved relative to said pressing means, said pressing means being positioned relative to said heating means and to the motion of said supported coil of self-bond wires such that actuation of said pressing means occurs after actuation of said heating means.

2. Apparatus according to claim 1 wherein said moving means comprises a moveable conveyor member for moving a plurality of said supported coils of self-bond wires, said pressing means is in fixed position relative to said moveable conveyor member, and said heating means effects heating of said plurality of supported coil of self-bond wires moved on said moveable conveyor member to said pressing means.

3. Apparatus according to claim 1 wherein said moving means comprises a fixed support member for holding a plurality of said supported coils of self-bond wires and means for moving said pressing means relative to the fixed support member.

4. Apparatus according to claim 1 further including means for encasing a supported coil of self-bond wires during actuation of said heating means.

5. Apparatus according to claim 1 further including means for cooling said pressing means.

6. Apparatus according to claim 1 wherein said pressing means comprises a plurality of pressing molds.

7. Apparatus according to claim 1 wherein said pressing means comprises a pressing element insertable axially into a supported coil of self-bond wires, said pressing element being moveable radially outwards to effect pressing.

8. Apparatus according to claim 1 wherein said heating means comprises means for connecting the wire of said coil to a source of electrical current.

* * * * *